United States Patent Office 3,595,842
Patented July 27, 1971

3,595,842
NOVEL CATALYSTS FOR POLYMERIZATION OF ETHYLENE-ALPHA-OLEFIN DIENE TERPOLYMER RUBBERS
Alberg Schrage, East Orange, and Jules Ernest Schoenberg, Bergenfield, N.J., assignors to Dart Industries Inc., Los Angeles, Calif.
No Drawing. Filed Mar. 5, 1968, Ser. No. 710,643
Int. Cl. C08f 15/40
U.S. Cl. 260—80.78                           9 Claims

ABSTRACT OF THE DISCLOSURE

Ethylene-alpha-olefin terpolymerization process resulting in products of reduced gel content, in which more particularly, rubbery terpolymers of ethylene, propylene, and a bridged ring diene hydrocarbon are prepared by transition metal catalysts in the presence of gel suppressing compounds consisting of amines, ethers, sulfides, siloxanes or phosphorous compounds or mixtures thereof.

BACKGROUND OF INVENTION

This invention relates to the terpolymerization of ethylene, propylene and other alpha-olefins and non-conjugated dienes to form vulcanizable elastomers. More particularly, the invention pertains to the use of gel suppressant compounds in terpolymerization of ethylene, propylene and dienes, for example, dicyclopentadiene and to novel three component compositions.

PRIOR ART

It has heretofore been known to employ additives commonly designated as Lewis base to increase stereospecificity of homopolymers of alpha-olefins when titanium halides are used to prepare crystalline polymers for use as plastics. It could not have been predicted from the prior disclosures in the case of copolymer preparation that certain of the additives disclosed could be used with a vanadium catalyst in which case they have no effect on crystallinity but result in the unexpected property of inhibition of cross-linking or gel formation in those systems where this is a problem.

Copolymers of ethylene and propylene are not convenient to cure as is known in this art of elastomeric compositions. Unlike natural rubber or styrene-butadiene rubber, ethylene-propylene elastomers contain practically no carbon-to-carbon double bonds to function as sulfur curring sites and thus the curing procedures familiar to the rubber trade cannot be used. Alternative methods for curing, such as the use of high energy radiation or the employment of organic peroxides, are more expensive and may limit the choice of antioxidants which can be incoporated into the uncured copolymer.

Among the dienes which have been used in preparation of vulcanizable elastomers are dicyclopentadiene, methylenenorbornene, ethylidenenorbornene and 1,5-cyclo octadiene. As indicated, elastomeric compositions prepared from these are subject to formation of gels during their manufacture.

The prior art teaches that it is most satisfactory to employ a non-conjugated diene in order to impart the proper kind and amount of unsaturation. Thus, the non-conjugated diene chosen must contain one double bond which is reactive towards polymerization with the other monomers and one which is inactive or non-reactive and therefore which appears as unsaturation in the terpolymer. When the second unsaturated linkage is reactive in the polymerization, then the terpolymer product will contain undesirably high levels of cross-linked insoluble gel and unsatisfactory levels of unsaturation. High levels of gels in vulcanizable elastomeric compositions result in poor processability during compounding and low tensile strength in the vulcanizate.

Although some of the better known unsaturated cyclic dienes are effective and useful for elastomeric preparation with ethylene and propylene, for example, the high levels of gels obtained in the polymerization reactions detract considerably from their use. The search continues therefore for unsaturates which do not form substantial amounts of gel and are competitive, or in the alternative, for methods of suppressing gel formation. The present invention presents one solution to the gel formation problem and enables the use therefore of cheaply available unsaturates for sulfur vulcanizable elastomer manufacture.

STATEMENT OF INVENTION

One object of the present invention is to prepare rubbery terpolymers which are substantially free of insoluble, cross-linked material.

Another object of the invention is to provide novel catalysts for preparation of rubbery terpolymers.

A further object of the invention is to utilize compositions which function effectively as gel suppressants for polymerization reaction involving vulcanizable elastomers to reduce the gel content thereof.

A still further object of the invention is to reduce the crosslinked polymer content of ethylene-propylene-cyclic diene terpolymers.

These and other objects will be apparent from the more detailed description of the invention set forth hereinafter.

The above objects are accomplished by carrying out the polymerizations of ethylene, an alpha-olefin and a diene using three component catalyst systems comprising a vanadium compound, an alkyl aluminum compound and one of a group of additives which can be an amine, an ether, a sulfide, a silicon-containing compound, or a phosphorus-containing compound, which additive does not substantially interfere with the polymerization activity. By employing the additives herein mentioned in terpolymerizations of ethylene, propylene, and a cyclic diene, for example, the rate of polymerization is in some cases moderately decreased but the formation of gel or cross-linked polymer is substantially decreased.

The polymerization additives of this invention has been found useful to decrease gel formation for rubbery vulcanizable terpolymers of ethylene, propylene and cyclic dienes as hereinbefore stated.

The novel catalysts of this invention useful for the preparation of elastomeric compositions to reduce gel content are compositions comprising a vanadium compound, an aluminum compound as a cocatalyst and a minor amount of an organic compound selected from the group consisting of amines, ethers, sulfides silicons and phosphorous compositions or mixtures which do not contain a Zerewitinoff hydrogen.

PREFERRED EMBODIMENTS

The use of the additives of this invention can reduce the gel formation of the elastomers to levels which permit their use commercially. In many cases the additives permit production of terpolymers containing substantially less than 15 percent and usually less than 5 percent gel.

In general, the additive is employed in ratios of 0.01 to 0.75 mole of additive per gram atom of aluminum in the coordination catalyst system used in the polymerization. The preferred level is a ratio of 0.025 and up to 0.5 of additive to aluminum. Thus, using diamines, a ratio of 0.025 of amine to aluminum in the catalyst is suitable.

It is not understood why and how these additives function to suppress gel formation. From a theoretical point of view the additive compounds can be classified as election donor compounds although some of the effective additives do not easily fit this description. It must be realized, however, that some compounds and classes of compounds are much more effective than others. Among the amines which have been found most useful are the tertiary amines. Aliphatic diamines are particularly useful, as are alicyclic, aromatic and heterocyclic ring compounds containing one or more nitrogen atoms. Specific amine compounds include tri-n-butyl amine, dimethylaniline, pyridine, the picolines, the lutidines, N,N,N',N'-tetramethylene diamine, quinoline, triethylamine, N,N,N',N'-tetramethyl - 1,2 - propanediamine, N,N'-dimethylpiperazine, hexamethylenetetramine, and triethylene diamine. Among the ethers which are useful as additives are the aliphatic and aromatic ethers as well as the mixed ethers. The ethylene glycol ethers as well as the ethers in which the ethereal oxygen is a part of the alicyclic or aromatic ring also function as modifiers in the invention. Specific ethers include anisole, tetrahydrofuran, ethylene glycol dimethyl ether, diethyl ether, diphenyl ether, and a ketone such as benzophenone. Compounds which combine more than one hetero atom such as morpholines and N-pyridine oxide are also useful.

In addition to the ethers and amines above, the following also function as gel suppressants: hexamethylphosphoramide, dimethoxydiphenylsilane, tetrakis(dimethylamino)silane, demethoxydimethylsilane, trimethoxyphenylsilane, tetramethoxysilane, diphenylsulfide, diethylsulfide, thiophene.

It is to be noted from the above list of additives applicable herein that the singularly common attribute of all is the absence of active hydrogen atoms, that is, acidic hydrogens. Such additives would not form methane when reacted with a methyl Grignard reagent. The additives of this invention are those therefore that do not possess a Zerewitinoff hydrogen.

Although in general most of the additives above tend to reduce the rate of polymerization, several of the additives actually, unpredictably, increase the rate of polymerization and others do not alter the rate substantially. For example, N,N'-dimethylpiperazine in ratios of 0.01 to 0.1 of N/Al increases the rate of polymerization when used in connection with vanadium tetrachloride-diethylaluminum chloride catalysts (also triethylenediamine and others—see below).

It is a feature of this invention that the polymerization reaction to be most effective when using a light hydrocarbon diluent or solvent such as butane must be initiated in the absence of the diene compound for a period of time of about 1 to 2 minutes. Thus ethylene-alpha-olefin copolymerization is carried on for about 1 to 5 minutes, followed then by the addition of the diene composition. By following this procedure the additives are effective suppressing gel formation as indicated above. If all three monomers are present at initiation of the polymerization reaction, that is, the ethylene, alpha-olefin and diene, then the additives are not effective in suppressing gel formation. This finding was indeed surprising since this sort of action could not have been predicted from what has been published in the art.

Using ethylene, propylene, which are the preferred, and the selected diene as monomers, the monomer ratio is adjusted so as to obtain in the final terpolymer an ethylene content ranging between 30% and 70% by weight, and a propylene content ranging between 30% and 70% by weight. The amount of the diene which is present in the terpolymer must exceed 0.1% and it is preferred that the diene content should be from 3 to 15% by weight which gives an iodine number of from about 5 to about 30. It is best to introduce only enough of the diene so that the polymer can be cured satisfactorily, since the good ageing properties associated with ethylene-propylene rubber are thereby maintained; an unnecessary excess of the diene may spoil the ageing properties. Examples of useful 1-olefins other than propylene are butene-1, hexene-1, 4-methylpentene-1, 5-methylhexene-1, and 4-ethylhexene-1. The preferred 1-olefin for the terpolymers as indicated is propylene.

The additives of this invention are most useful in the terpolymerization reactions herein to suppress gel formation with the transition metal compound vanadium tetrachloride, vanadium oxytrichloride, vanadium tris (acetylacetonate) and partial esters of vanadium oxytrichloride. The teaching herein applies to any vanadium compound, the use of which results in production of gel in terpolymerization reactions and can be improved in its function, that is, the additives herein can be used to suppress such gel formation in elastomeric preparations.

These vanadium compounds are used in conjunction with alkyl aluminum compounds having the structure $(X)_3Al$ or $(X)_2AlY$ where the X groups are alkyl groups containing 1 to 12 carbon atoms, for example, ethyl, isobutyl, octyl, or dodecyl groups and Y is a chloride atom or a bromide atom. The relative proportions of the vanadium salt and the organoaluminum compound may be varied so that the value of the atomic ratio of aluminum to vanadium ranges between 2:1 to 50:1, preferably 5:1 to 10:1.

The vanadium and aluminum compound derivative which when mixed form the active component of the catalyst, can be reacted in the presence, or absence of the monomers to be polymerized. The active component of the catalyst can also be formed in situ in the polymerization reaction, or preformed separately, prior to the polymerization.

This preparation of the catalyst can be carried out at a temperature which is higher or lower than ambient temperature, in general at a temperature ranging from —30° C. to +40° C., in the presence of polymerization solvents, in an inert gas atmosphere and at atmospheric pressure.

The polymerization reaction is carried out at temperatures ranging between —30° C. and +40° C., preferably between —20° C. and +30° C. Pressures can be varied between 1 and 10 atmospheres, preferably between 1 and 5 atmospheres.

The reaction because of the limited catalyst lifetime is generally caused to occur within relatively short periods of time (5 to 60 minutes). Upon completion of the reaction, the polymer, a major fraction of which is soluble in the solvents used, is recovered by coagulation and dried according to conventional techniques.

Solvents such as aromatic, aliphatic or cycloaliphatic hydrocarbons, or saturated or unsaturated chlorinated hydrocarbons, such as toluene, heptane, cyclohexane, tetrachloroethylene and carbon tetrachloride, are conveniently employed. It is also possible to operate without solvents by employing an excess quantity of the least reactive olefin, for example, by carrying out the terpolymerization in liquid propylene. The efficiency of the additives of this invention in suppressing gel varies somewhat according to the hydrocarbon used as diluent in the polymerization reaction. The additives in general are more efficient in aromatic and alicyclic hydrocarbons as diluents or solvents than in aliphatic solvents.

It is preferred to carry the reaction out as a continuous polymerization. The monomers are added either together or preferably as separate streams in a continuous or semi-continuous manner. Operating thusly, the resulting polymer product shows good distribution of the diene monomer and the corresponding degree of unsaturation to be expected from the diene reacted. Unreacted monomers are conveniently recovered, purified and recycled.

The degree of unsaturation was determined chemically, by addition of iodine monochloride according to T. S. Lee, I. M. Kolthoff, M. S. Mairs, J. Polymer Sci., 3, 66, (1948); T. S. Lee et al., Anal. Chem. 22, 995, (1950).

The molecular weights of the polymers were determined by measuring the inherent viscosities. The values of the inherent viscosity were a function of the mode of operation under the above indicated conditions and may vary from 1 to 8, and more often from 1.5 to 5.

The terpolymers prepared by the process of this invention are rubbery in nature and capable of vulcanization. They can be cured to highly useful elastomers. A wide variety of procedures can be employed for curing. For example, the terpolymers can be readily cured with sulfur. Any of the procedures familiar to those skilled in the processing of other rubbers such as natural rubber, butadiene-styrene rubber (SBR), and butyl rubber are suitable.

Various procedures and modifications of sulphur curing are described in Encyclopedia of Chemical Technology, Kirk and Othmer, published by Interscience Encyclopedia, Inc., New York, 1953, vol. 11, pages 892–927; Principles of High-Polymer Theory and Practice, Schmidt and Marlies, published by McGraw-Hill Book Co., Inc., New York, 1958, pages 556–566; and Chemistry and Technology of Rubber, Davis and Blake, published by Reinhold Publishing Corporation, New York, 1937, chapter VI.

Instead of sulphur curing, which is preferred, a free radical cure can also be employed.

Many compounding agents may be incorporated with these polymers during curing in order to improve various properties. For example, they can be loaded with carbon black in order to increase the tensile strength. Other compounding agents include titanium dioxide and silica.

These terpolmers have many uses. They can be employed in the manufacture of tires, inner tubes, belts, hose and tubing, footwear, sponges, coatings and a wide variety of coated or molded articles, where their gel-free composition is of special advantage. They have good thermal stability and excellent resistance to ozone. The following examples illustrate the invention. All parts are by weight unless otherwise indicated.

EXAMPLE 1

A typical preparation of an ethylene-propylene-diene terpolymer will be illustrated. A 1.5 l. stirred autoclave was flushed with ethylene and charged with 40 p.s.i.g. of ethylene, 500 ml. of butane, 215 ml. of propylene, 1.0 ml. of diethyl aluminum chloride, and 0.032 ml. (N/Al=0.025) of N,N,N',N'-tetramethyl-1, 2-propanediamine. The temperature was brought to 25° C. and the reaction started with the slow addition of a 0.050 M solution of $VCl_4$ in n-butane. A 17 volume percent solution of dicyclopentadiene in n-butane was continuously added along with the $VCl_4$ solution during a 25 minute period while the pressure was maintained between 77–90 p.s.i.g. with the addition of a monomer mixture containing 52 mole percent ethylene and 48 mole percent propylene. The solvent was then vented while 500 ml. of a 0.2% solution of "Ionol" (trademark name for 2,6-ditertiary-butyl - 4 - methylphenol) in isopropanol was simultaneously added. The terpolymer rubber, which was recovered as fine beads, was washed in a blender with the "Ionol"-isopropanol mixture and vacuum dried.

The product had an inherent viscosity (0.08% solution in Decalin at 130° C.) of 2.1 and an iodine number of 10.1, and contained 0.8% gel. The catalyst efficiency was 670 grams rubber per gram $VCl_4$. (In the examples to follow "catalyst efficiency" or "productivity" will be understood to mean grams of rubber produced per gram of vanadium compound.) By polymerizing under the same conditions without the N,NN',N'-tetramethyl-1, 2-propanediamine the rubber product was obtained at the same catalyst efficiency but contained 27% gel.

Table I below summarizes the effect of various amine (except for one ether compound) compounds on ethylene-propylene-dicyclopentadiene terpolymerizations carried under substantially the same conditions as above.

TABLE I.—RATIO OF ADDITIVE TO ALUMINUM

| Run No. | Vanadium compound | Aluminum compound | Additive | Ratio | Productivity | IV [1] | Iodine No. | Percent gel [2] |
|---|---|---|---|---|---|---|---|---|
| 1 | VOCl3 | DEAC [3] | None (control) | | 640 | N.D. | [4] 6.5 | 36 |
| 2 | VOCl3 | DEAC | Tri-n-butyl amine | 0.25 | 510 | N.D. | [4] 5.5 | 23 |
| 3 | VOCl3 | DEAC | Pyridine | 0.25 | 160 | 3.6 | [4] 8.0 | 9.4 |
| 4 | VOCl3 | DEAC | 4-picoline | 0.25 | 140 | 3.3 | [4] 8.0 | 14 |
| 5 | VOCl3 | DEAC | Anisole | 0.50 | 170 | 3.1 | 5.4 | 6.7 |
| 6 | VOCl3 | DEAC | N,N,N',N'-tetramethylethylenediamine | 0.125 | 150 | 3.6 | [4] 7.0 | 12 |
| 7 | VCl4 | Trihexyl aluminum | None (control) | | 440 | N.D. | [4] 8.0 | 34 |
| 8 | VCl4 | Diisobutyl-aluminum hydride | do | | 230 | N.D. | [4] 11.0 | 22 |
| 9 | VCl4 | DEAC | do | | 670 | | [4] 8.0 | 27 |
| 10 | VCl4 | DEAC | Pyridine | 0.25 | 550 | 2.0 | 8.5 | 2.1 |
| 11 | VCl4 | DEAC | 3-picoline | 0.25 | 290 | 2.2 | 7.0 | 2.2 |
| 12 | VCl4 | DEAC | Quinoline | 0.25 | 230 | 2.1 | 9.0 | 3.1 |
| 13 | VCl4 | DEAC | Triethylamine | 0.25 | 550 | 1.8 | 9.4 | 0.5 |
| 14 | VCl4 | DEAC | do | 0.050 | 620 | 2.4 | 7.5 | 2.6 |
| 15 | VCl4 | DEAC | N,N,N',N'-tetramethylethylenediamine | 0.125 | 210 | 1.3 | [4] 7.5 | 0.0 |
| 16 | VCl4 | DEAC | do | 0.025 | 660 | 2.5 | 8.0 | 0.6 |
| 17 | VCl4 | DEAC | N,N,N',N'-tetramethyl-1,2-propanediamine | 0.025 | 670 | 2.1 | 10.1 | 0.8 |
| 18 | VCl4 | DEAC | N,N'-dimethylpiperazine | 0.025 | 2,050 | 2.5 | 7.2 | 2.3 |
| 19 | VCl4 | DEAC | Hexamethylene tetramine | 0.025 | 860 | 2.8 | 7.0 | 1.0 |

[1] Inherent viscosity of 0.08 weight percent solution in Decalin at 130° C. to be used hereinafter unless otherwise noted.
[2] Residue insoluble in hexane at room temp. separated by centrifugation at 10,000 r.p.m. (12,000 g.). This definition will be used unless otherwise noted.
[3] Diethylaluminum monochloride.
[4] Estimated.

N.D.=Not determined.

EXAMPLE 2

In a manner similar to that described in Example 1 above, that is, the polymerization reaction condition, various ethers were studied for use in terpolymerizations of ethylene, propylene, and diene to reduce gel. The results are set forth in Table II below:

TABLE II.—RATIO OF ADDITIVE TO ALUMINUM

| Run No. | Vanadium compound | Aluminum compound | Additive | Ratio | Productivity | I.V. | Iodine No. | Percent gel |
|---|---|---|---|---|---|---|---|---|
| 1 | VOCl3 | DEAC | None (control) | | 640 | N.D. | [1] 6.5 | 36 |
| 2 | VOCl3 | DEAC | Anisole | 0.50 | 170 | 3.1 | 5.4 | 8.7 |
| 3 | VOCl3 | DEAC | Tetrahydrofuran | 0.50 | 110 | 2.9 | 6.9 | 8.6 |
| 4 | VOCl3 | DEAC | Ethylene glycol dimethylether | 0.25 | 62 | 1.3 | [1] 7.0 | 5.1 |
| 5 | VCl4 | DEAC | None (control) | | 670 | | [1] 8.0 | 27 |
| 6 | VCl4 | DEAC | Anisole | 0.50 | 530 | 2.6 | 5.3 | 0.9 |
| 7 | VCl4 | DEAC | Tetrahydrofuran | 0.50 | 240 | 2.5 | 6.9 | 4.8 |
| 8 | VCl4 | DEAC | Diethyl ether | 0.50 | 440 | 2.8 | 6.8 | 2.8 |
| 9 | VCl4 | DEAC | Diphenyl ether | 0.50 | 350 | 2.8 | 7.3 | 1.7 |
| 10 | VCl4 | DEAC | Ethylene glycol dimethyl ether | 0.125 | 170 | 1.7 | 8.5 | 0.4 |
| 11 | VCl4 | DEAC | do | 0.025 | 330 | 1.9 | 8.6 | 1.7 |

[1] Estimated.
N.D.=Not determined.

EXAMPLE 3

A series of runs was made preparing ethylene-propylene-dicyclopentadiene terpolymers using the polymerization procedure of Example 1 except that in runs number 8 to 12 hydrogen was added to the empty reactor in the amount indicated. The results are summarized in Table III. The $VCl_4$-diethylaluminum chloride catalyst system was used.

EXAMPLE 5

This example, which was carried out in the same manner as Example 3, demonstrates the use of two of the preferred additives herein, namely anisole and triethylenediamine ("DABCO"). These additives are preferred because they do not reduce catalyst productivity and are efficient at low levels. This is illustrated in Table V below.

TABLE III

| Run No. | Additive | Ratio | Temp. °C. | $H_2$ p.s.i. | Productivity | Percent gel | I.V. | Iodine No. |
|---|---|---|---|---|---|---|---|---|
| 1 | Benzophenone | .25 | 23 | | 590 | 1.6 | 2.34 | 6.2 |
| 2 | Anisole | .50 | 23 | | 1,080 | 1.2 | 3.53 | 5.7 |
| 3 | do | .50 | 35 | | 540 | 3.9 | 3.07 | 4.3 |
| 4 | Triethylenediamine | .025 | 35 | | 570 | 5.0 | 3.39 | 5.8 |
| 5 | do | .025 | 24 | | 1,300 | 1.1 | 2.71 | 6.4 |
| 6 | do | .025 | 24 | | 1,200 | 1.7 | 3.37 | 6.9 |
| 7 | do | .025 | 24 | | 1,160 | 1.3 | 2.46 | 5.4 |
| 8 | do | .050 | 23 | 0.5 | 900 | 0.6 | 1.58 | 7.1 |
| 9 | Anisole | .25 | 23 | 10 | 1,260 | 0.5 | 0.47 | 7.7 |
| 10 | do | .25 | 23 | 3 | 1,040 | 0.6 | 1.00 | 7.9 |
| 11 | do | .25 | 23 | 1 | 920 | 0.9 | 1.65 | 7.1 |
| 12 | do | .25 | 23 | 2 | 730 | 0.7 | 1.20 | 9.3 |

EXAMPLE 4

In the following table there is illustrated the effect of additives in solvents other than butane which has been shown heretofore. The diene used was dicyclopentadiene and the polymerization procedure was similar to that of Example 1.

The reaction temperature was 22° C. and the catalyst system was composed of $VCl_4$ and diethylaluminum chloride.

TABLE V

| Run No. | Amount of diethylaluminum chloride (ml.) | Additive | Ratio of additive/aluminum | $H_2$ (p.s.i.) | Productivity | Iodine No. | Percent gel | I.V. |
|---|---|---|---|---|---|---|---|---|
| 1 | 0.25 | Anisole | 0.125 | | 1,130 | 6.9 | 1.5 | 3.40 |
| 2 | 0.25 | do | 0.25 | | 770 | 8.0 | 2.3 | 2.74 |
| 3 | 0.25 | do | 0.25 | | 1,100 | 7.0 | 0.6 | 3.02 |
| 4 | 0.25 | do | 0.25 | 1.0 | 920 | 7.1 | 0.9 | 1.65 |
| 5 | 0.25 | do | 0.25 | 2.0 | 730 | 9.3 | 0.7 | 1.20 |
| 6 | 0.25 | do | 0.25 | 3.0 | 1,040 | 7.9 | 0.6 | 1.00 |
| 7 | 0.25 | do | 0.25 | 10.0 | 1,260 | 7.7 | 0.5 | 0.47 |
| 8 | 0.25 | do | 0.50 | | 860 | 6.3 | 1.2 | 4.56 |
| 9 | 0.25 | do | 0.50 | | 1,080 | 5.7 | 1.2 | 3.53 |
| 10 | 1.0 | do | 0.50 | | 1,030 | 6.0 | 1.0 | 3.64 |
| 11 | 0.25 | Triethylenediamine | 0.025 | | 1,200 | 5.6 | 1.7 | 3.37 |
| 12 | 0.50 | do | 0.025 | | 1,300 | 6.4 | 1.1 | 2.71 |
| 13 | 1.00 | do | 0.025 | | 1,160 | 6.4 | 1.3 | 2.46 |
| 14 | 0.25 | do | 0.050 | | 1,090 | 8.7 | 7.1 | 3.81 |
| 15 | 0.25 | do | 0.050 | 0.5 | 900 | 7.1 | 0.6 | 1.58 |
| 16 | 0.25 | do | 0.10 | | 1,220 | 6.6 | 1.0 | 3.34 |

NOTE.—For the two additives above, molar fraction of additive to aluminum has only a small effect on catalyst productivity and I.V. of the product. In contrast, the amounts of hydrogen used (runs 4,5,6,7 and 15) and the quantity of diethylaluminum chloride (runs 10,12 and 13) has substantial effect on molecular weight.

EXAMPLE 6

As shown in the table below, certain additives have a very pronounced effect on the molecular weights of the

TABLE IV

| Run No. | Solvent | Additive | Temp., °C. | Additive/aluminum ration | Productivity | Percent gel | Intrinsic viscosity | Iodine number |
|---|---|---|---|---|---|---|---|---|
| 1 | Hexane | Anisole | 22 | 0.25 | 690 | 29.8 | 2.94 | |
| 2 | Cyclohexane | do | 22 | 0.25 | 1,340 | 1.3 | 2.19 | 5.0 |
| 3 | Benzene | do | 22 | 0.25 | 1,080 | 2.3 | 4.34 | 9.5 |
| 4 | do | do | 22 | 0.25 | 1,080 | 0.3 | 3.46 | 6.5 |
| 5 | do ($VOCl_3$) catalyst | do | 0.22 | 0.25 | 720 | 5.0 | 4.22 | 7.2 | ethylene-propylene dicyclopentadiene terpolymers. The polymerizations were run by a procedure similar to that of Example 1 using diethylaluminum chloride as the cocatalyst.

thereof, said additive being free of Zerewitinoff hydrogens, wherein said additive is employed in ratios of 0.01 to 0.75 mole of said additive per gram/atom of aluminum in said catalyst,

TABLE VI

| Run No. | Vanadium compound | Additive | Ratio of additive/ aluminum | Productivity | Iodine No. | Percent gel | I.V. |
|---|---|---|---|---|---|---|---|
| 1 | VCl₄ | 1,2-dimethoxyethane | 0.025 | 330 | 8.6 | 1.7 | 1.93 |
| 2 | VCl₄ | do | 0.125 | 170 | 8.5 | 0.4 | 1.72 |
| 3 | VOCl₃ | do | 0.025 | 160 | N.D. | 20.6 | 3.96 |
| 4 | VOCl₃ | do | 0.25 | 62 | N.D. | 5.1 | 1.33 |
| 5 | VCl₄ | Triethylamine | 0.050 | 620 | 7.5 | 2.6 | 2.35 |
| 6 | VCl₄ | do | 0.25 | 550 | 9.4 | 0.5 | 1.81 |
| 7 | VCl₄ | N,N,N',N'-tetramethylethylenediamine | 0.025 | 660 | 8.0 | 0.6 | 2.51 |
| 8 | VCl₄ | do | 0.125 | 210 | N.D. | 0.0 | 1.27 |

N. D.=Not determined.

Thus, the additive of this invention as noted in the above tables, are also useful for other functions in addition to the function of suppressing gel and these added functions contribute great benefits to this invention.

Although the process of this invention has been specifically described with reference to preferred embodiments herein, modifications can be made falling within the spirit of this invention and the scope of the appended claims.

What is claimed is:

1. In a process for the manufacture of vulcanizable polymers of ethylene-propylene-dicyclopentadiene terpolymer which comprises polymerizing a monomer mixture in the presence of a catalytic amount of a coordination catalyst comprising a vanadium compound selected from the group consisting of vanadium tetrachloride, vanadium oxytrichloride, vanadium tris (acetylacetonate) and partial esters of vanadium oxytrichloride and an alkyl aluminum compound having the structure:

$$(X)_3Al \text{ or } (X)_2AlY$$

wherein

X is an alkyl group containing 1 to 12 carbon atoms, and
Y a chloride atom or a bromide atom, and a solvent selected from the group consisting of aromatic, aliphatic and cycloaliphatic hydrocarbons, saturated chlorinated hydrocarbons and unsaturated chlorinated hydrocarbons at temperatures of −30° C. to 40° C., the improvement which comprises the following sequential steps:

(a) copolymerizing for a period at least 1 to 2 minutes ethylene and propylene in the presence of said solvent; said coordination catalyst, wherein the atomic ratio of aluminum to vanadium in said catalyst ranges between 2:1 to 50:1; and an additive selected from the group consisting of amines, ethers, sulfides, siloxanes and phosphorous compounds or mixtures (b) terpolymerizing dicyclopentadiene, said ethylene and said propylene by addition of said dicyclopentadiene to the mixture of step (1), and (c) recovering a rubbery, vulcanizable terpolymer product containing substantially less than 15% gels.

2. The process of claim 1 wherein the polymerization is carried out in the presence of a tertiary amine.

3. The process of claim 1 wherein the polymerization is carried out in the presence of an ether.

4. The process of claim 1 wherein the polymerization is carried out in the presence of a tertiary amine in an amount such that there is a ratio of 0.025 to 0.5 amine to aluminum.

5. The process of claim 1 wherein the polymerization is carried out in the presence of an ether, in an amount such that there is a ratio of 0.025 to 0.5 ether to aluminum.

6. The process of claim 1 wherein the polymerization is carried out in the presence of N,N'-dimethyl piperazine.

7. The process of claim 1 wherein the polymerization is carried out in the presence of anisole.

8. The process of claim 1 wherein the polymerization is carried out in the presence of triethylenediamine.

9. The process of claim 1 wherein said vanadium compound contains chlorine.

References Cited

UNITED STATES PATENTS

| 2,977,349 | 3/1961 | Brockway | 260—94.3 |
| 3,165,503 | 1/1965 | Kahn | 260—94.3 |
| 3,219,648 | 11/1965 | Hill | 260—93.7 |
| 3,260,708 | 7/1966 | Natta | 260—79.5 |
| 3,281,398 | 10/1966 | Natta | 260—79.5 |
| 3,305,538 | 2/1967 | Natta | 260—93.7 |

JOSEPH L. SCHOFER, Primary Examiner
R. S. BENJAMIN, Assistant Examiner